(12) United States Patent
Schmid et al.

(10) Patent No.: US 9,677,823 B2
(45) Date of Patent: Jun. 13, 2017

(54) HEAT EXCHANGER

(71) Applicant: Behr GmbH & Co. KG, Stuttgart (DE)

(72) Inventors: Caroline Schmid, Stuttgart (DE); Michael Moser, Rainau (DE); Nikolaus Daubitzer, Stuttgart (DE); Holger Schroth, Maulbronn (DE); Heiko Neff, Auenwald (DE); Dominique Raible, Rottenburg (DE); Anton Kierig, Stuttgart (DE); Thomas Schiehlen, Altheim (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 246 days.

(21) Appl. No.: 14/039,131

(22) Filed: Sep. 27, 2013

(65) Prior Publication Data

US 2014/0090813 A1     Apr. 3, 2014

(30) Foreign Application Priority Data

Sep. 28, 2012   (DE) .................. 10 2012 217 868

(51) Int. Cl.
| | |
|---|---|
| *F28F 7/00* | (2006.01) |
| *F28F 3/12* | (2006.01) |
| *F28F 3/14* | (2006.01) |
| *F28F 13/06* | (2006.01) |
| *F28F 21/06* | (2006.01) |
| *H01M 10/625* | (2014.01) |

(Continued)

(52) U.S. Cl.
CPC .............. *F28F 3/12* (2013.01); *F28F 13/06* (2013.01); *F28F 21/067* (2013.01);
(Continued)

(58) Field of Classification Search
CPC .. F28D 2021/0043; F28D 1/03; F28D 1/0308; F28D 1/0325; F28D 1/0341;
(Continued)

(56) References Cited

U.S. PATENT DOCUMENTS

| | | | |
|---|---|---|---|
| 4,955,435 A * | 9/1990 | Shuster et al. ................. | 165/170 |
| 6,173,758 B1 * | 1/2001 | Ward ...................... | F28F 3/022 |
| | | | 165/185 |

(Continued)

FOREIGN PATENT DOCUMENTS

| | | |
|---|---|---|
| CN | 1636126 A | 7/2005 |
| CN | 1936487 A | 3/2007 |

(Continued)

OTHER PUBLICATIONS

German Search Report, Application No. DE 10 2012 217 868.6, Aug. 1, 2013, 8 pgs.

*Primary Examiner* — Ryan J Walters
*Assistant Examiner* — Jason Thompson
(74) *Attorney, Agent, or Firm* — Paul D. Strain, Esq.; Strain & Strain PLLC

(57) ABSTRACT

Heat exchanger having a housing, having a first fluid port and having a second fluid port, wherein the housing is in fluid communication with a fluid source via the fluid ports, wherein the housing can be traversed by a flow of a fluid, wherein the housing is of multi-part design and has a housing upper part and a housing lower part, wherein the housing upper part and/or the housing lower part has a base region and an at least partially encircling turned-up edge region, wherein housing the two parts are formed from a plastic or a fiber composite material.

8 Claims, 2 Drawing Sheets

(51) Int. Cl.
*H01M 10/6556* (2014.01)
*H01M 10/613* (2014.01)
*F28D 21/00* (2006.01)

(52) U.S. Cl.
CPC ....... *H01M 10/613* (2015.04); *H01M 10/625* (2015.04); *H01M 10/6556* (2015.04); *F28D 2021/0043* (2013.01)

(58) Field of Classification Search
CPC ...... F28D 1/035; F28D 1/0366; F28D 1/0383; F28F 3/02; F28F 3/022; F28F 3/04; F28F 3/042; F28F 3/044; F28F 3/048; F28F 3/12; H01M 10/613; H01M 10/635; H01M 10/66
USPC ................. 165/80.4, 168, 169, 170
See application file for complete search history.

(56) References Cited

U.S. PATENT DOCUMENTS

| | | | |
|---|---|---|---|
| 6,247,529 B1 * | 6/2001 | Shimizu et al. ............. | 165/183 |
| 7,036,572 B2 | 5/2006 | Sohn | |
| 7,215,545 B1 * | 5/2007 | Moghaddam ....... | H01L 23/3732 165/185 |
| 2004/0150271 A1 * | 8/2004 | Koga et al. .................... | 310/64 |
| 2004/0188066 A1 * | 9/2004 | Upadhya ................ | F04B 17/00 165/80.4 |
| 2005/0115700 A1 * | 6/2005 | Martin et al. ................. | 165/170 |
| 2006/0191675 A1 * | 8/2006 | Fletcher ................. | F28F 3/022 165/172 |
| 2007/0062681 A1 * | 3/2007 | Beech .......................... | 165/170 |
| 2008/0066893 A1 | 3/2008 | Oh et al. | |
| 2012/0087091 A1 | 4/2012 | Nassoiy | |
| 2012/0237805 A1 | 9/2012 | Abels et al. | |

FOREIGN PATENT DOCUMENTS

| | | |
|---|---|---|
| CN | 201583162 U | 9/2010 |
| DE | 196 00 166 A1 | 7/1997 |
| DE | 699 20 842 T2 | 2/2005 |
| DE | 20 2012 102 349 U1 | 9/2012 |
| DE | 11 2011 103 338 T5 | 7/2013 |
| WO | WO 2013/101737 A1 | 7/2013 |

\* cited by examiner

HEAT EXCHANGER

CROSS-REFERENCE TO RELATED PATENT APPLICATIONS

This application is based upon and claims the benefit of priority from prior German Patent Application No. 10 2012 217 868.6, filed Sep. 28, 2012, the entire contents of which are incorporated herein by reference in their entirety.

TECHNICAL FIELD

Heat exchanger having a housing, having a first fluid port and having a second fluid port, wherein the housing is in fluid communication with a fluid source via the fluid ports, wherein the housing can be traversed by a flow of a fluid.

PRIOR ART

In electric vehicles, energy stores are used for operating an electric motor. As energy stores, use is often made of storage batteries based on lithium-ion technology, or of nickel-metal hydride storage batteries. Alternatively, use is also made of high-performance capacitors, so-called supercaps.

In the case of all of the energy stores mentioned, an intense generation of heat occurs during operation, in particular during fast charging and discharging of the energy stores.

Temperatures of approximately 50° C. and higher may however damage the energy stores and significantly reduce the service life thereof. Likewise, excessively low temperatures cause lasting damage to the energy stores.

To maintain the performance of the energy stores, the temperature of these must therefore be actively controlled. Periods where cooling is required are more prevalent by far. The cooling may be realized for example by the introduction of heat exchangers through which fluid flows. In solutions according to the prior art, the heat exchangers are often elements through which fluid flows and which have, between two areal cover plates, one or more fluid ducts through which a fluid can flow.

It is advantageous here for all of the cells of the energy store to be kept at a uniform temperature level. Likewise, intense temperature gradients within the cells should be avoided.

The plates of the heat exchangers can be traversed by a flow of a cold fluid during cooling, though may also be traversed by a flow of a warm fluid for the purpose of heating.

To attain the highest possible energy efficiency, in particular in electric vehicles, a design which is optimized as far as possible with regard to weight is advantageous.

In the prior art, solutions are described which use heat exchangers manufactured from metallic materials. Such a solution is disclosed for example by the utility model DE 20 2012 102 349 U1.

A disadvantage of the solutions according to the prior art is in particular that the heat exchangers are composed entirely from aluminum. These are considerably heavier in relation to designs composed of plastic or of a mixture of aluminum and plastic. Also, owing to the electrical conductivity of the aluminum, there is a need for electrical insulation and for potential equalization means for the heat exchangers. Furthermore, the production of heat exchangers from aluminum is energy-intensive and expensive. Furthermore, as a result of the use of brazing materials such as flux, for example, reworking steps are often necessary.

PRESENTATION OF THE INVENTION, PROBLEM, SOLUTION, ADVANTAGES

It is therefore the object of the present invention to provide a heat exchanger which has a weight-optimized design and the production of which is less energy-intensive and less expensive. Furthermore, the heat exchanger should be formed without additional electrical insulation.

The object of the present invention is achieved by means of a heat exchanger having the features of Claim 1.

An exemplary embodiment of the invention concerns a heat exchanger having a housing, having a first fluid port and having a second fluid port, wherein the housing is in fluid communication with a fluid source via the fluid ports, wherein the housing can be traversed by a flow of a fluid, wherein the housing is of multi-part design and has a housing upper part and a housing lower part, wherein the housing upper part and/or the housing lower part has a base region and an at least partially encircling turned-up edge region, wherein housing the two parts are formed from a plastic or a fiber composite material.

In one exemplary embodiment, the heat exchanger according to the invention serves for controlling the temperature of an energy store.

The construction of the housing of the heat exchanger from elements composed of plastic is particularly advantageous with regard to the weight of the heat exchanger. Through the use of plastics, the weight can be reduced in relation to a heat exchanger manufactured entirely or partially from a metallic material. Furthermore, the two housing parts formed from a plastic can be produced in a simple manner. Plastics can be formed into a virtually unrestricted range of shapes using simple, inexpensive methods.

Furthermore, plastics are significantly cheaper than for example metallic materials, in particular as lightweight materials, such as aluminium or aluminium alloys.

The formation of the housing lower part as a base region having at least partially turned-up edge regions is particularly advantageous because a stabilizing action is realized by means of the turned-up edge regions. At the same time, the housing lower part forms, in the interior of the housing, a cavity through which a fluid can flow. The housing lower part can be closed off in the upward direction by means of the housing upper part. In this way, a space is generated which is closed off in a completely fluid-tight manner and which can be traversed by a flow of a fluid.

Both the housing lower part and also the housing upper part are simple and inexpensive to produce and can be connected to one another by means of numerous connecting methods. Aside from the use of thermal joining processes, the two elements may also be connected to one another by mechanical or chemical connecting means.

It is also preferable for a flow-guiding element to be arranged in the interior of the housing. By means of a flow-guiding element, the fluid flow in the interior of the housing can be influenced in a targeted manner.

It is also advantageous for the housing to have a multiplicity of flow-guiding elements in its interior. The fluid flow can be influenced even more effectively by means of a multiplicity of flow elements. This leads to a more expedient flow pattern within the heat exchanger.

In a further advantageous embodiment, it may be provided that the heat exchanger has multiple flow-guiding elements which are in the form of webs or walls or studs and which form between them one flow field, in particular at least one flow duct, for the fluid.

By means of a multiplicity of flow-guiding elements, it is possible for a multiplicity of flow ducts or a flow field to be defined in the interior of the housing. The fluid can be conducted in a targeted manner through the housing along said flow ducts.

Here, the flow-guiding elements may for example be formed from rectilinear walls or by means of individual stud-like elevations. Other configurations of the flow-guiding elements may also be provided.

Aside from flow guidance, said elements may also be used for changing a laminar flow into a turbulent flow in order to achieve more intense mixing of the fluid, and thereby improve the heat transfer.

It is also preferable if a predefinable flow field can be achieved by means of a predefinable geometric arrangement of webs and/or studs.

By means of the webs and/or studs positioned upstream of the flow field, the fluid flow can be influenced in a targeted manner, for example in order to achieve a turbulent or laminar flow in the flow field. It is also possible for a fluid distribution function to be realized by means of the studs and/or webs.

In one refinement of the invention, it may be provided that turbulence regions can be predefined in the flow field by means of the geometric arrangement of the studs and/or of the webs.

Turbulence regions are advantageous because, by means of these, the mixing of the fluid can be intensified, and thus a more homogenous temperature distribution can be attained.

In a particularly expedient refinement of the invention, it may also be provided that, in the fully assembled state, the flow-guiding element is in contact with the housing upper part and/or with the housing lower part.

By means of contact of the flow-guiding element with both the housing upper part and also the housing lower part, it can be achieved that the fluid flows only around and not over the flow-guiding elements, because said flow-guiding elements, at their top side and bottom side respectively, are in direct contact with the housing lower part and with the housing upper part. If at least some of the flow-guiding elements are in the form of walls, contact both with the housing upper part and also with the housing lower part can serve to form flow ducts which can be traversed by a flow of the fluid.

In one particularly expedient refinement of the invention, it may be provided that the flow-guiding element runs parallel to one of the turned-up edge regions of the housing lower part.

By means of an embodiment of a flow-guiding element or of multiple flow-guiding elements as described above, it is possible to produce a multiplicity of flow ducts which extend through the housing substantially parallel to one of the outer edges thereof. This can be advantageous with regard to the distribution of the fluid. By means of such an embodiment of the flow-guiding elements, the fluid can for example be conducted in a targeted manner from a fluid inlet to a fluid outlet.

By means of the generation of flow ducts, it is also possible for the distribution of the fluid within the housing to be influenced.

Furthermore, in an advantageous refinement, it may be provided that the housing upper part or the housing lower part has the first fluid port and the second fluid inlet, or that the housing upper part and the housing lower part have in each case one of the two fluid ports.

It is also expedient for the first fluid port and/or the second fluid port to be formed by an opening on one of the turned-up edge regions of the housing lower part.

By means of an arrangement of one fluid port or both fluid ports on one of the turned-up edge regions, it is possible for the fluid to be supplied and discharged laterally. This is particularly advantageous because, in this way, the substantially planar main surfaces of the housing upper part and of the housing lower part can be used entirely as heat transfer surfaces. Said solution is also advantageous if only a very small amount of installation space is available.

In a further preferred exemplary embodiment, it may be provided that the housing has, in its interior, a partition which divides the internal volume into a first chamber and a second chamber which are in fluid communication with one another via at least one break in the partition.

The division of the internal volume into a first chamber and a second chamber is particularly advantageous because, in this way, it is possible to generate an ordered flow of the fluid within the housing.

A preferred exemplary embodiment may be characterized in that one of the fluid ports is in fluid communication with the first chamber and the respective other fluid port is in fluid communication with the second chamber.

By means of such an assignment of the fluid ports to in each case one of the chambers, a flow path is predefined for the fluid. Here, the fluid flows through one fluid port into one of the chambers and passes over, along the break in the partition, into the second chamber. There, the fluid flows along the second chamber to a second fluid port and out of the housing. Furthermore, by means of such a guided flow, the generation of flow build-up points, which can lead to local excessive increases in temperature, is prevented.

Advantageous refinements of the present invention are described in the subclaims and in the following description of the figures.

BRIEF DESCRIPTION OF THE DRAWINGS

The invention will be explained in detail below on the basis of exemplary embodiments and with reference to the drawings, in which.

PREFERRED EMBODIMENT OF THE INVENTION

Figure 1:
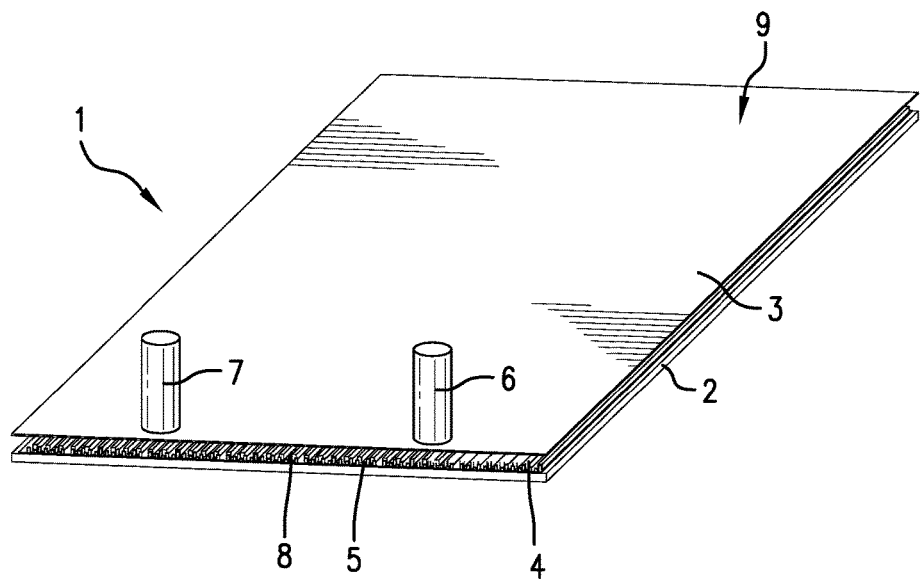
FIG. 1 shows a perspective plan view of a heat exchanger according to the invention, wherein the housing upper part has been detached from the housing lower part.

FIG. 1 shows a perspective view of a heat exchanger 1. The heat exchanger 1 is composed substantially of a housing 9 which is formed by a housing lower part 2 and a housing upper part 3. The heat exchanger 1 has a first fluid port 6 and a second fluid port 7. The two fluid ports 6, 7 may be configured selectively as a fluid inlet or fluid outlet.

The housing upper part 3 has a substantially planar extent. The housing lower part 2 is formed substantially from a planar base region and turned-up edge regions. The housing upper part 3 is dimensioned so as to close off the housing lower part 2 with an accurate fit. A fluid-tight connection can thus be generated between the housing upper part 3 and the housing lower part 2. The internal volume that is formed between the housing lower part 2 and the housing upper part 3 corresponds to the volume of the housing 9 which can be traversed by a flow of a fluid.

The housing lower part 2 has a multiplicity of flow-guiding elements 4, 5. Furthermore, the housing lower part 2 has a partition 8 which runs in the interior of the housing lower part 2 and which divides the internal volume of the housing 9 of the heat exchanger 1 into a first chamber and a second chamber. The first chamber is in fluid communication with the second chamber at at least one location in the interior of the heat exchanger 1. Said location at which the fluid communication between the first chamber and the second chamber takes place is advantageously situated in a region as far remote from the fluid ports 6, 7 as possible.

The flow-guiding elements 4 shown in FIG. 1 are formed substantially by walls that run, parallel to the partition 8, in the interior of the housing lower part 2. By means of said flow-guiding elements 4, multiple flow ducts through which a fluid can flow are formed in the heat exchanger 1. The flow-guiding elements 4 are in this case dimensioned such that, in the assembled state, they are in contact both with the housing lower part 2 and also with the housing upper part 3. In this way, the fluid is prevented from being able to flow over or under the flow-guiding elements 4, and said fluid can flow through the heat exchanger 1 only in the flow ducts formed by the flow-guiding elements 4. Here, the flow-guiding elements 4 do not extend over the entire length of the heat exchanger 1.

In the front region of the heat exchanger 1, which also has the fluid ports 6, 7, the flow-guiding elements 5 are provided instead of the flow-guiding elements 4. The flow-guiding elements 5 are individual studs which are arranged in the interior of the housing lower part 2 and, in some embodiments, are in contact with the housing upper part and/or with the housing lower part. Said flow-guiding elements 5 serve primarily for controlling the flow of the fluid that can flow into the heat exchanger 1 through the fluid port 6 or fluid port 7. The individual studs allow the fluid to distribute over the width of the respective chamber before the fluid flows into the flow ducts formed by the flow-guiding elements 4.

Flow-guiding elements 5 are likewise arranged in the rear region of the heat exchanger 1 situated substantially opposite the fluid ports 6, 7. In said region, the fluid flows out of the flow ducts between the flow-guiding elements 4, and there, flows over from one chamber into the respective other chamber. In this case, the flow-guiding elements 5 serve for generating turbulence in the fluid in order to generate a more uniform temperature distribution. The respective other chamber of the heat exchanger 1 is of corresponding construction to the first chamber. The second chamber likewise has flow-guiding elements 5 in the region in which the flow passes out of the first chamber, and has flow-guiding elements 4 in the form of walls along the second chamber. Likewise, below the fluid port 7, the second chamber again has the stud-like flow-guiding elements 5 which allow the fluid from the individual flow ducts to be collected and conducted to the fluid port 7.

Here, both the flow-guiding elements 4 and also the flow-guiding elements 5 are illustrated merely by way of example. Designs which differ from these may also be provided in alternative embodiments. For example, walls which run in a zigzag pattern or walls which follow an undulating shape may also be provided for the flow-guiding elements 4. Instead of the studs, there may also be provided inter alia embossed elevations and depressions, or for example spherical elements that serve to generate turbulence in the flow.

The fluid ports 6, 7 may be arranged on the housing upper part 3 as shown in FIG. 1. In alternative embodiments, however, said fluid ports may also be provided on the housing lower part 2. In a further alternative embodiment, it may likewise be provided that one of the fluid ports 6, 7 is arranged on the housing upper part 3 and a further fluid port 7, 6 is arranged on the housing lower part 2. The exact position of the fluid ports should be selected in accordance with the later installation conditions and the desired throughflow configuration.

The heat exchanger 1 shown in FIG. 1 is traversed by flow in a U-shaped throughflow configuration, that is to say the fluid flows through one of the chambers and, as it passes over into the second chamber, is diverted substantially through an angle of approximately 180° before flowing back counter to the first main flow direction. It would alternatively also be possible to provide a throughflow in an I-shaped throughflow configuration. In this case, the partition in the interior of the heat exchanger 1 would be omitted, and the fluid ports would be provided at opposite ends of the heat exchanger 1.

Both the housing upper part 3 and also the housing lower part 2 are advantageously produced from a plastic or a fiber-reinforced plastic. The production of the housing 9 from plastic leads to a reduction in the weight of the heat exchanger 1. Furthermore, the production of the housing 9 from plastics components is cheaper than the production of the housing from metallic materials.

As a result of the housing 9 being formed from plastic, electrical insulation is also provided, which is advantageous in particular with regard to use on electrical components, such as batteries, storage batteries or capacitors.

Furthermore, plastics components can be configured in terms of shape with fewer restrictions. In this way, the heat exchanger 1 can be better adapted to the structural conditions of its installation location.

Figure 2:
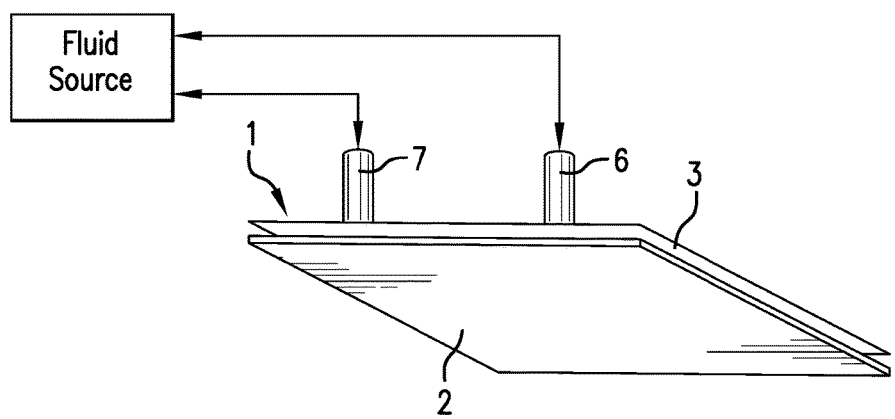
FIG. 2 shows a further perspective view of a heat exchanger as per FIG. 1.

FIG. 2 shows a further perspective view of a heat exchanger 1 as per FIG. 1. The illustration shows in particular the housing upper part 3, the housing lower part 2 and the fluid ports 6, 7. The view of FIG. 2, similarly to FIG. 1, shows the heat exchanger 1 in the non-assembled state, that is to say the housing upper part 3 is not mounted on the housing lower part 2. As a result, there is an air gap between the housing upper part 3 and the housing lower part 2.

Figure 3:
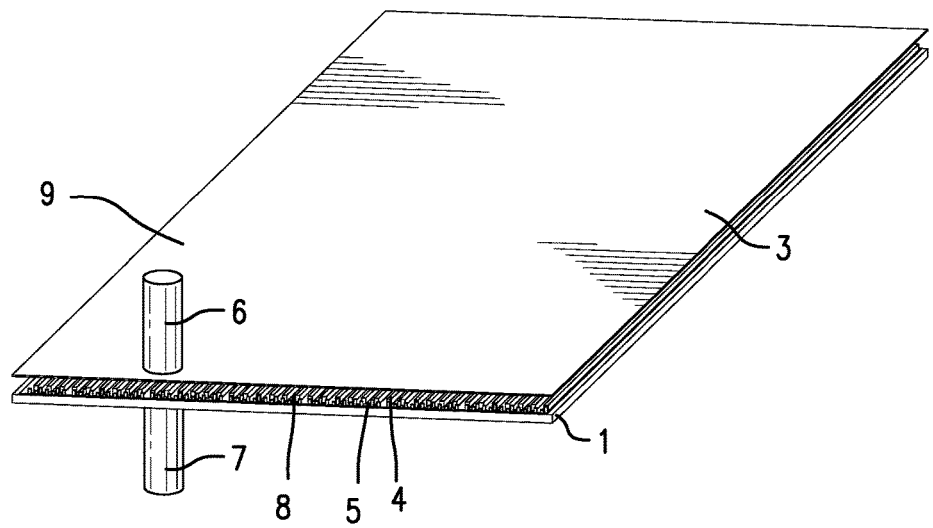
FIG. 3 shows a perspective view of a heat exchanger according to the invention, having a housing which is of multi-part design and which is composed of a housing lower part and of a housing upper part.

FIG. 3 shows the housing 9 of the heat exchanger 1. The illustration shows substantially the housing lower part 2, the housing upper part 3 and the flow-guiding elements 4, 5 in the housing lower part 2. The housing 9 has a rectangular outline. In alternative embodiments, a design that differs from this may also be provided. For example, a housing 9 may be provided which has rounded edges and a significantly elongated extent, or a circular outline of the housing 9 may be provided.

Figure 4:
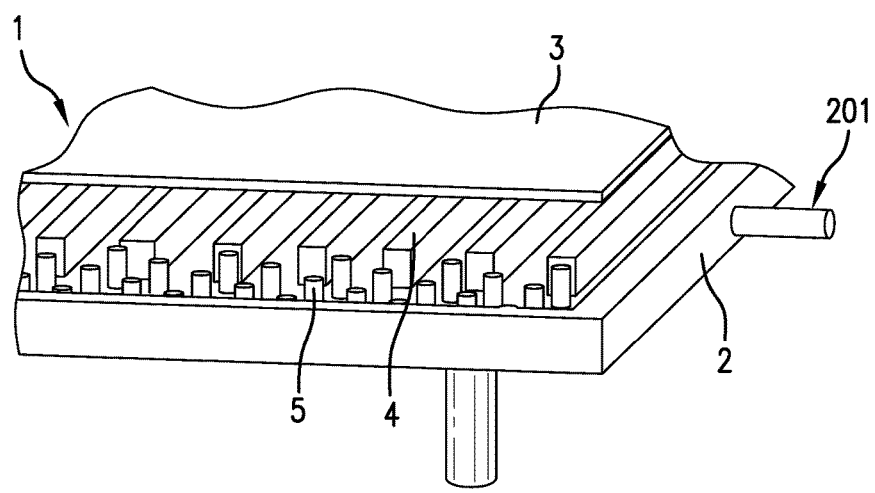
FIG. 4 shows a detail view of the heat exchanger, wherein, in the interior of the housing lower part, there is illustrated a multiplicity of flow-guiding elements, some of which are in the form of rectilinear walls and some of which are in the form of cylindrical studs.

FIG. 4 shows a detail view of the housing lower part 2 and of the housing upper part 3, situated above said housing lower part, of the heat exchanger 1.

It is possible to particularly clearly see the flow-guiding elements 4 which are designed as rectilinear walls running parallel to the outer edges and parallel to the partition 8. In the front and rear edge regions, stud-like flow-guiding elements 5 are provided instead of the rectilinear walls of the flow-guiding elements 4. In one embodiment, the first fluid port and/or the second fluid port 201 is formed by an opening in one of the turned-up regions of the housing lower part.

In an alternative embodiment, the flow-guiding elements 5 may also be omitted. It is a task of the flow-guiding elements 5 to generate a distribution of a fluid transversely with respect to the main flow direction predefined for the fluid between the flow-guiding elements 4. In particular in conjunction with the fluid ports 6, 7 shown in FIGS. 1 and 2, it is necessary for the fluid, after it flows into the heat exchanger 1, to distribute within the respective chamber over the width of the chamber or of the heat exchanger 1, before said fluid flows into the flow ducts between the flow-guiding elements 4. This is likewise provided at the region at which the fluid flows over from the first chamber into the second chamber, as well as in the region of the second fluid port 6, 7.

The connection of the housing parts to one another may advantageously be realized by welding. This is particularly advantageous when the housing upper part 3 and the housing lower part 2 are formed from the same material.

At the same time, the formation of the housing 9 from a plastic offers the advantage that electrical insulation is provided by the housing 9 itself. Furthermore, the housing 9 can be produced in a simple method such as injection molding, for example. It is thus possible for not only the housing 9 but also the flow-guiding elements 4, 5 to be produced in one working step, whereby process steps can be eliminated, and thus cheaper production is attained.

The invention claimed is:

1. A heat exchanger comprising:
a housing,
a first fluid port, and
a second fluid port wherein the housing is traversed by a flow of a fluid, wherein the housing is of multi-part design and has a housing upper part and a housing lower part, wherein the housing lower part has a planar base region and an at least partially encircling turned-up edge region arranged orthogonally to the planar base region, wherein the housing upper part is planar, wherein the housing upper part and the housing lower part are formed from a plastic or a fiber composite material,
wherein the housing has, in its interior, a partition which divides the internal volume into a first chamber and a second chamber which are in fluid communication with one another via a break in the partition,
further comprising flow guiding elements arranged in an interior space of the housing, wherein the first fluid port is in fluid communication with the first chamber and the second fluid port is in fluid communication with the second chamber, wherein the first fluid port and the second fluid port are formed on a front region of the heat exchanger, wherein a first group of flow guiding elements formed near the first fluid port and the second fluid port are formed as individual studs, wherein a second group of flow guiding elements formed in a rear region of the heat exchanger opposite the first fluid port and second fluid port are formed as individual studs that induce a turbulent flow of fluid, wherein a third group of flow guiding elements formed in between the front region and the rear region are formed as walls that bound a plurality of ducts within each of the first chamber and the second chamber,
wherein the studs are cylindrical elevations arranged on the planar base region of housing lower part or the planar housing upper part,
wherein flow guiding elements of the first group, second group, or third group of flow guiding elements are in the form of webs or walls or studs and which form between them at least a flow field for the fluid,
wherein, in the fully assembled state, the second group of flow-guiding elements is in contact with the housing upper part and with the housing lower part,
wherein, in the fully assembled state, the first group and the third group of flow-guiding elements are in contact with either the housing upper part or the housing lower part but not both.

2. The heat exchanger according to claim 1, wherein a predefinable flow field can be achieved by using a predefinable geometric arrangement of webs or studs.

3. The heat exchanger according to claim 1, wherein turbulence regions can be predefined in the flow field by using the geometric arrangement of the studs or of the webs.

4. The heat exchanger according to claim 1, wherein the second group of flow-guiding elements runs parallel to one of the turned-up edge regions of the housing lower part.

5. The heat exchanger according to claim 1, wherein the housing upper part or the housing lower part has the first fluid port and the second fluid port, or the housing upper part and the housing lower part have in each case one of the two fluid ports.

6. The heat exchanger according to claim 1, wherein the first fluid port or the second fluid port is formed by an opening on one of the turned-up edge regions of the housing lower part.

7. The heat exchanger according to claim 6, wherein one of the fluid ports is in fluid communication with the first chamber and the respective other fluid port is in fluid communication with the second chamber.

8. A heat exchanger comprising:
a housing,
a first fluid port, and
a second fluid port, wherein the housing is traversed by a flow of a fluid, wherein the housing is of multi-part design and has a housing upper part and a housing lower part, wherein the housing lower part has a planar base region and an at least partially encircling turned-up edge region arranged orthogonally to the planar base region, wherein the housing upper part is planar, wherein the housing upper part and the housing lower part are formed from a plastic or a fiber composite material,
wherein the housing has, in its interior, a partition which divides the internal volume into a first chamber and a second chamber which are in fluid communication with one another via a break in the partition,
further comprising flow guiding elements arranged in an interior space of the housing, wherein the first fluid port is in fluid communication with the first chamber and the second fluid port is in fluid communication with the second chamber, wherein the first fluid port and the second fluid port are formed on a front region of the heat exchanger, wherein a first group of flow guiding elements formed near the first fluid port and the second fluid port are formed as individual studs, wherein a second group of flow guiding elements formed in a rear region of the heat exchanger opposite the first fluid port and second fluid port are formed as individual studs that induce a turbulent flow of fluid, wherein a third group of flow guiding elements formed in between the front region and the rear region are formed as walls that bound a plurality of ducts within each of the first chamber and the second chamber, wherein one of the fluid ports is in fluid communication with the first chamber and the respective other fluid port is in fluid communication with the second chamber, wherein the second group of flow-guiding elements runs parallel to one of the turned-up edge regions of the housing lower part, wherein, in the fully assembled state, the first group and the third group of flow-guiding elements are in contact with either the housing upper part or the housing lower part but not both, and wherein, in the fully assembled state, the second group of flow guiding elements are in contact with both the housing upper part and the housing lower part, wherein the studs are cylindrical elevations arranged on the planar base region of housing lower part or the planar housing upper part.

\* \* \* \* \*